May 9, 1961 A. ANDRISANI 2,983,049

SHEET POSITIONING METHOD AND APPARATUS

Filed May 29, 1959 4 Sheets-Sheet 1

INVENTOR.
ALBERT ANDRISANI

BY Robert H. Fraser

ATTORNEY

May 9, 1961 A. ANDRISANI 2,983,049

SHEET POSITIONING METHOD AND APPARATUS

Filed May 29, 1959

4 Sheets-Sheet 2

INVENTOR
ALBERT ANDRISANI
BY [signature]
ATTORNEY

May 9, 1961 A. ANDRISANI 2,983,049

SHEET POSITIONING METHOD AND APPARATUS

Filed May 29, 1959 4 Sheets-Sheet 3

INVENTOR
ALBERT ANDRISANI
BY Robert H. [signature]
ATTORNEY

May 9, 1961 A. ANDRISANI 2,983,049
SHEET POSITIONING METHOD AND APPARATUS
Filed May 29, 1959 4 Sheets-Sheet 4

INVENTOR
ALBERT ANDRISANI
BY Robert H. [signature]
ATTORNEY

United States Patent Office 2,983,049

Patented May 9, 1961

2,983,049

SHEET POSITIONING METHOD AND APPARATUS

Albert Andrisani, 5057 Elmwood Ave., Los Angeles, Calif.

Filed May 29, 1959, Ser. No. 817,966

12 Claims. (Cl. 33—184.5)

This invention relates to a method and apparatus for positioning sheets, and more particularly to an improved method and apparatus for preparing and positioning an image carrier in a step and repeat type printing process.

This application is a continuation-in-part of my application entitled "Sheet Positioning Method and Apparatus," filed April 1, 1957, and having Serial Number 649,801, now abandoned.

In the type of lithographic printing known as step and repeat printing where rows and columns of like images are prepared by stepping an image producing transparency from position to position, a problem has been the location of the image producing transparency so that the several images may be placed in proper position with a minimum of manual skill. Also, in multi-color printing where several color images must be accurately registered and where several images are to be reproduced by step and repeat type printing, the problem of registering the transparencies or the carriers bearing the transparencies has been difficult.

Although attempts have been made to overcome the aforementioned difficulties, the apparatus involved tends to be complex and difficult to operate by inexperienced persons.

Accordingly, it is an object of the present invention to provide an improved and simplified method and apparatus for positioning a transparency or image carrier in step and repeat type printing.

It is an additional object of the present invention to provide an improved method and apparatus for positioning a transparency or image carrier for step and repeat type printing in which the transparency or image carrier is prepared in such a way that step and repeat type printing may be accomplished with a precise and accurate reproduction of several images and a high degree of registration between images in a color printing process.

It is a further object of the present invention to provide an improved method by which a transparency or image carrier may be positioned for printing like images in several rows by a step and repeat type printing process It is still another object of the present invention to provide an accurate registering device which is adapted to prepare transparencies or image carriers for step and repeat type printing where the distance between adjacent images and rows of images may be selected adavntageously.

Briefly, the present invention provides in one form an L-shaped registering device having indexing holes into which may be placed pegs corresponding to the distances between adjacent images in a row and between rows of images, with the pegs being adapted to index a mask or transparency in increments of distance which may be less than the distance between indexing holes in the device. With the pegs in position in the L-shaped device an image carrier is placed on the device and holes are cut in the carrier corresponding roughly to the location of the pegs. Indexing tabs are then attached to the image carrier which are adapted to mate precisely with the pegs in the registering device and cover the rough holes in the carrier so that the carrier is prepared for step and repeat type printing along an indexing strip having pegs placed in selected ones of equally spaced holes corresponding to the position of the pegs in the registering device. The carrier may be stepped from position to position in rows along the indexing strip in a step and repeat type printing process to form rows of adjacent like images.

In another form, devices constructed in accordance with the invention may utilize a rectangular bed having marginal rows of indexing holes. Top and bottom sheets affixed to the bed provide a unitary structure into which the pags can be preset in a desired pattern. As thus constructed, the entire structure may be placed in a vacuum frame for step and repeat operations, but the structure may also be used for other types of layout and alignment work.

A better understanding of the invention may be had from a reading of the following specification and an inspection of the drawings, in which.

Figure 1:
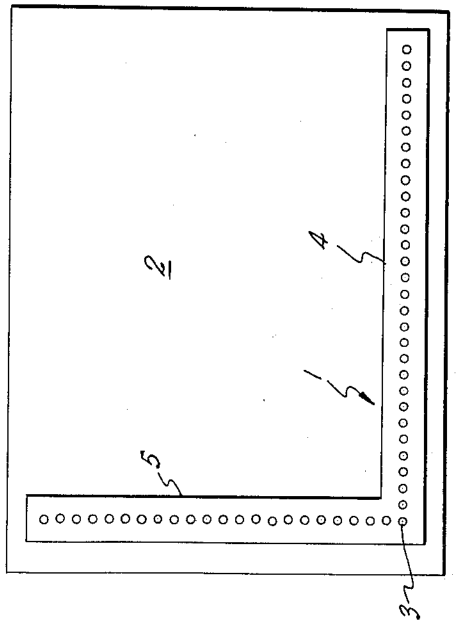
Fig. 1 depicts an L-shaped registering device.

In Fig. 1 there is shown an L-shaped registering device 1 which is placed on a bed 2 which may be for example, the surface of a photocomposing table used in the preparation and indexing of transparencies for printing.

The registering device 1 includes a corner hole 3 which is common to both a horizontal arm 4 and a transverse or vertical arm 5. Along each of the arms 4 and 5 are formed indexing holes which are regularly spaced. In Figs. 2–11 pegs are shown which are adapted to be placed in the holes of the registering device 1 at positions corresponding to selected distances for preparation of a transparency or image carrier for use in a step and repeat type printing process.

Figures 2, 3, 4, 5, 6, 7, 8, 9, 10, 11:
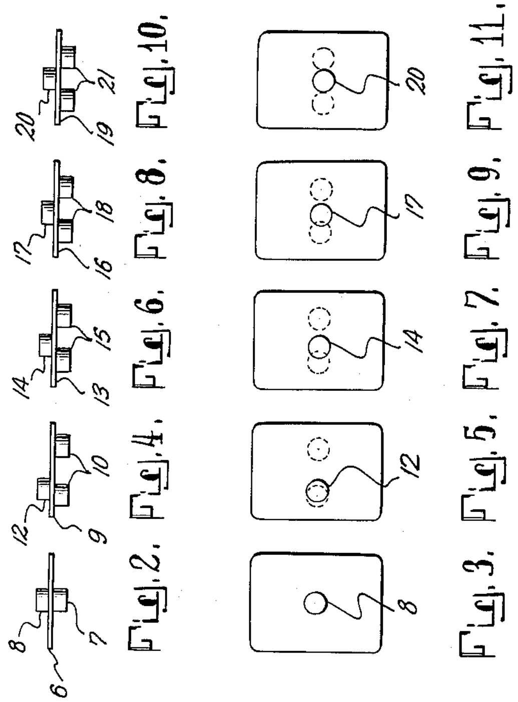
Fig. 2 is a side view of one type of peg for use in the device of Fig. 1.
Fig. 3 is a plan view of the peg of Fig. 2.
Fig. 4 is a side view of a first compound offset peg.
Fig. 5 is a plan view of the peg of Fig. 4.
Fig. 6 is a side view of a second compound offset peg.
Fig. 7 is a plan view of the peg of Fig. 6.
Fig. 8 is a side view of a third compound offset peg.
Fig. 9 is a plan view of the peg of Fig. 8.
Fig. 10 is a side view of a fourth compound offset peg.
Fig. 11 is a plan view of the peg of Fig. 10.

The peg of Figs. 2 and 3 includes a pin plate 6 to which is attached a lower pin 7 for engaging in a hole in the device 1 and an upper pin 8 axially aligned with the lower pin for engaging an image carrier. Pegs of the type indicated in Figs. 2 and 3 may be used in the corner hole 3 as well as in the holes along the arms 4 and 5 where the distance between images or rows of images falls at the exact location of one of the holes.

The pegs of Figs. 4–11 are specially designed to provide for distances other than those which fall at the location of the holes of the device 1. For example, the peg of Figs. 4 and 5 includes a pin plate 9 having a pair of lower pins 10 which are spaced apart by a distance equal to the distance of adjacent holes of the registering device 1. Also attached to the pin plate 9 is a pin 12 which is offset by a predetermined distance between the pins 10. In like fashion, but by a different predetermined offset distance in each instance, the peg of Figs. 6–7 includes a pin plate 13 to which an offset pin 14 and a pair of pins 15 are attached; the peg of Figs. 8–9 includes a pin plate 16 to which an offset pin 17 and a pair of pins 18 are attached; and the peg of Figs. 10–11 includes a pin plate 19 to which an offset pin 20 and a pair of pins 21 are attached.

The peg of Figs. 2–3 may be used when the selected distance falls at one of the indexing holes; the peg of Figs. 10–11 is used where the selected distance falls half way between adjacent holes; and the pegs of Figs. 4–9 provide for other distances. It should be noted that each of the pegs of Figs. 4–9 may be used for two separate distances by merely turning the peg around.

In one embodiment, the spacing between the centers of the holes in the registering device 1 is ½″ with the holes being ¼″ in diameter, leaving ¼″ of solid material between each pair of adjacent holes. With the above spacing of holes, the pegs may each include ¼″ pins, which in the case of the pairs of pins on the offset pegs, are likewise spaced by ½″ between centers. The pin 12 of the peg of Figs. 4–5 may be offset by 1⁄16″; the pin 14 of the peg of Figs. 6–7 may be offset by ⅛″; the pin 17 of the peg of Figs. 8–9 may be offset by 3⁄16″; and the pin 20 of the peg of Figs. 10–11 may be offset by ¼″.

Thus, through the use of correct ones of the pegs of Figs. 2–10 a pin may be provided which is located from a pin in the corner hole 3 by any desired distance in 1⁄16″ increments. In practice, a 1⁄16″ increment has been found to be sufficiently small for the vast majority of cases. However, it will be appreciated that additional offset pegs may be provided for smaller increments of distance if required.

Figure 12:
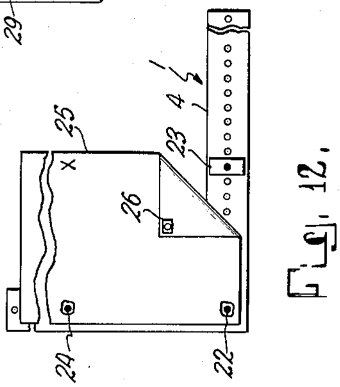
Fig. 12 is a plan view of a registering device with pegs and an image carrier in position for use.

In Fig. 12 there is shown a registering device 1 in the corner hole of which has been placed a peg 22 which may correspond to the type of peg shown in Figs. 2 and 3. On the horizontal arm 4 of the registering device 1 there is placed a peg 23 at a selected location. The peg 23 may be of any one of the types shown in Figs. 2–11 depending upon the increment of distance selected from the peg 22 in the corner hole 3. In like fashion, in the transverse arm 5 of the registering device 1, a peg 24 is placed in a selected location at a predetermined distance from the peg 22.

In using the registration device 1 and pegs 22, 23 and 24 an image carrier 25 may be laid over the registering device 1 and a roughly oriented hole cut in the image carrier 25 adjacent each of the pegs 22–24. After the roughly oriented holes have been cut, special tabs having perforations which precisely correspond with the shape of the pins on the pegs 22, 23 and 24 may be attached to the image carrier 25 to cover the roughly oriented hole and to securely index the image carrier 25 to the pegs 22–24. A corner of the image carrier 25 is folded back in Fig. 12 to show one of the tabs 26 for engaging the peg 23.

Figure 13:
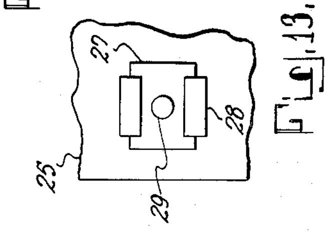
Fig. 13 is a partial view of an image carrier with an indexing tab attached.

Fig. 13 shows in detail a tab 27 attached to the image carrier 25 by means of conventional strips of cellophane tape 28. An accurately cut hole 29 in the tab 27 is adapted to mate precisely with a peg. Thus, by firmly fastening the perforated tab 27 to the image carrier 25 at the proper location, the image carrier 25 is exactly and precisely located with respect to the registering device 1.

Where the image carrier 25 is to be prepared for step and repeat type printing where adjacent rows of like images are to be printed, additional precisely located tabs may be attached by turning the image carrier 25 over and engaging the tab which previously engaged the corner hole peg 22 with the peg 24 and engaging the tab which previously engaged the peg 24 with the corner hole peg 22. By this means the region of the image carrier 25 indicated by the X may be located adjacent the peg 23 in the horizontal arm 4 of the registering device 1. By again cutting a roughly oriented hole in the image carrier 25 and attaching a perforated tab to the image carrier 25 in a position corresponding to the peg 23, two complete sets of accurately located tabs may be attached to the image carrier 25 by means of which two parallel rows of like images may be reproduced in a step and repeat type printing process.

Figure 14:
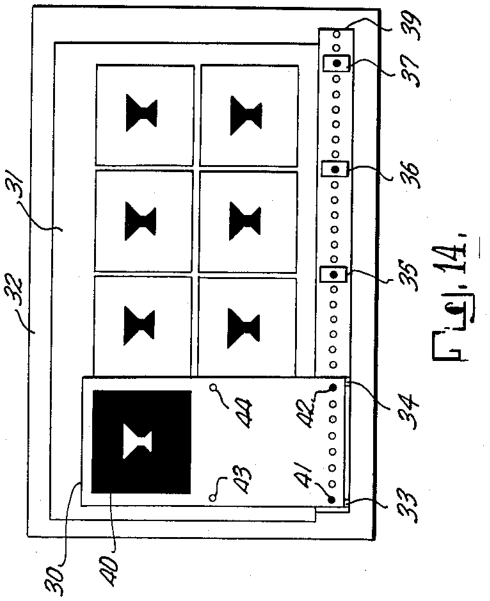
Fig. 14 is a plan view of an indexing strip and image carrier which are prepared for use in step and repeat type printing of two rows of like images.

Fig. 14 illustrates an image carrier 30 which has been prepared in the aforementioned fashion for the printing of two parallel like rows of images on a sensitized plate 31 supported by a bed 32 which may comprise a part of a conventional vacuum type printing frame. Although the L-shaped registering device 1 used to prepare the image carrier 30 may be moved to the printing frame for use in the step and repeat type process, the transverse arm 5 of the registering device 1 is not required and consequently the bed 32 of the vacuum frame of Fig. 14 may be provided with a single indexing strip 39 which has indexing holes corresponding to the indexing holes of the horizontal arm 4 of the registering device 1.

By inserting the pegs 33, 34, 35, 36 and 37 in the indexing strip 39 at positions corresponding to the distance between the pegs which were placed in the registering device 1 during preparation of the image carrier, a setup for a step and repeat type printing process may be established with a minimum of effort.

Attached to the carrier 30 is a transparency or negative 40 which corresponds to the image to be printed. In operation, the image carrier 30 is stepped along the pegs 33–37 using a first pair of holes 41 and 42 in the tabs attached to the image carrier 30 and at each location the sensitized plate 31 is exposed from a suitable source of radiation through the negative 40. Of course, it will be appreciated that the portions of the sensitized plate 31 which are not being exposed at any given time should be masked off in a conventional fashion by means of masking paper (not shown).

In order to print an adjacent row of like images, the image carrier 30 may be moved to step the holes 43 and 44 along the pegs 33–37. In this fashion, parallel rows of images are formed on the sensitized plate 31 in an accurate and precise location with a minimum of manual skill being required of the operator of the step and repeat printing process.

Although particular dimensions have been given for the holes and location of the pins in the illustrative embodiment, it will be appreciated that the invention is not limited thereto. It is contemplated that in a particular application it may be desirable to reduce or increase the size of the pins or to reduce or increase the spacing of the holes in the indexing device. Likewise, the size of the pin which engages the tabs on the image carrier need not be of the same size as the pins which engage the indexing device. In addition, although only two rows of like images have been illustrated in Fig. 14, it will be appreciated that the image carrier 30 may be prepared in the manner described above with respect to Fig. 12 to have any number of precisely located pairs of tabs for use in stepping off any number of rows of images.

Figure 15:
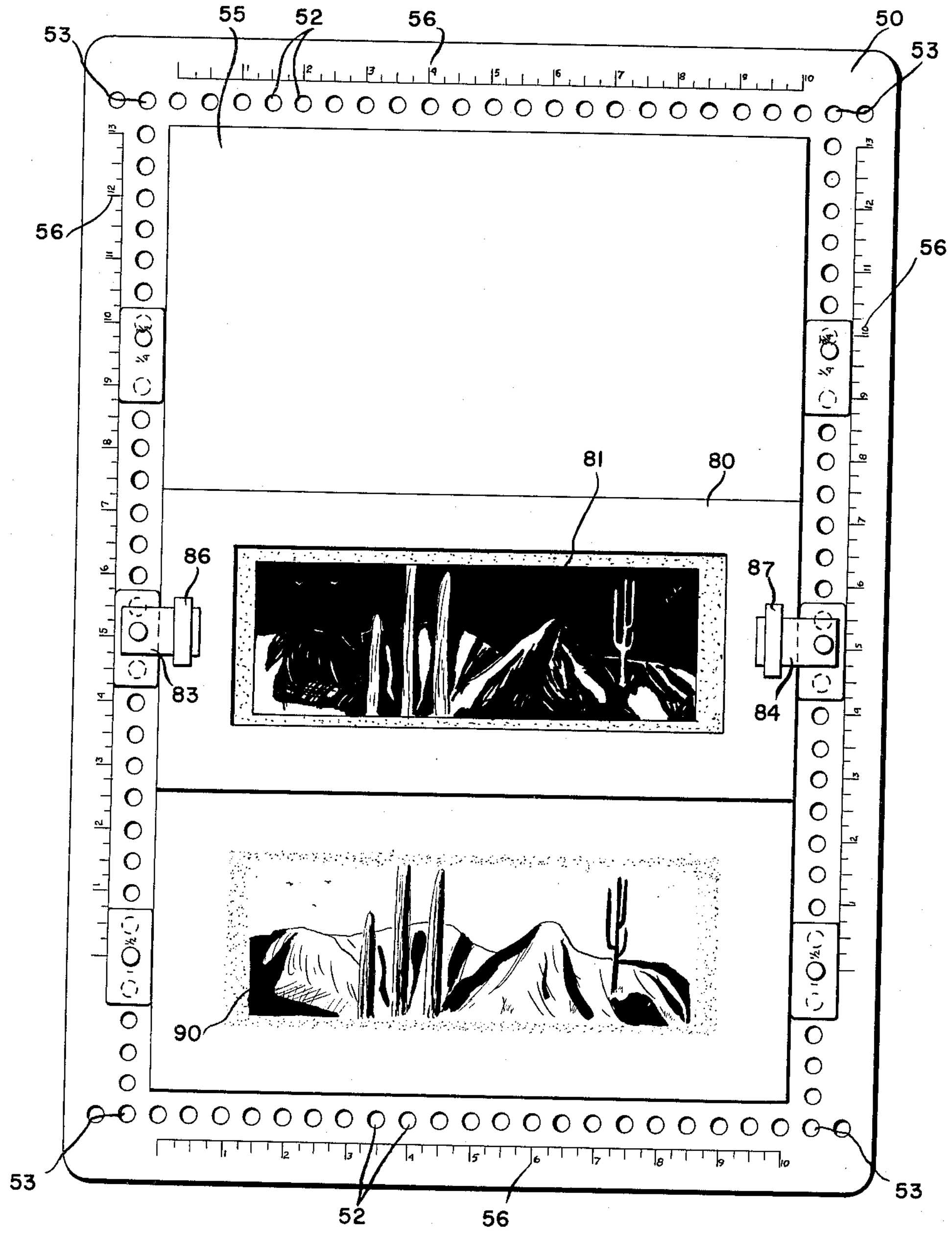
Fig. 15 is a plan view of another form of registering device using a rectangular central board showing pegs and an image carrier in use.
Figure 16:
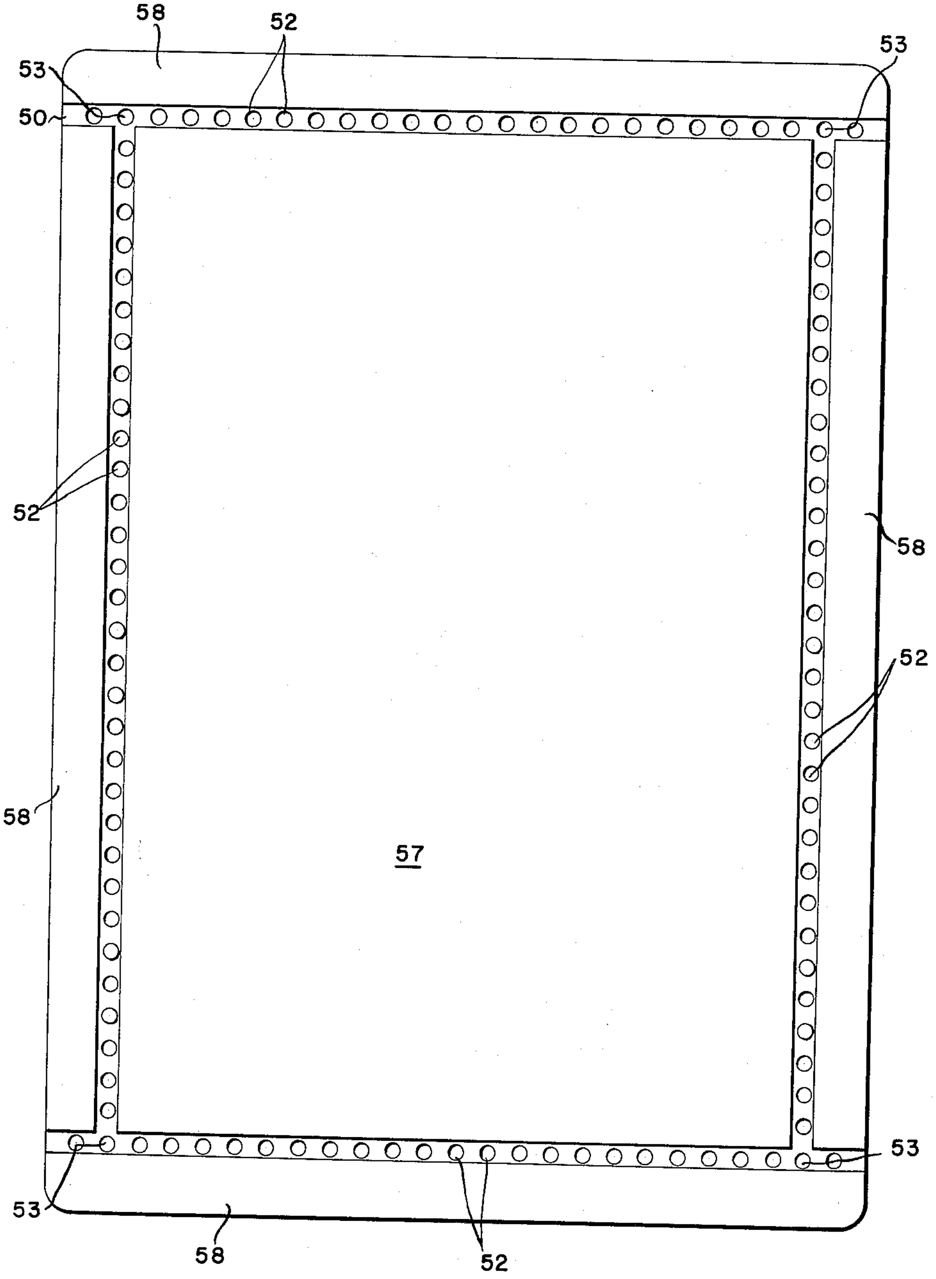
Fig. 16 is a bottom view of the arrangement of Fig. 15.
Figure 17:
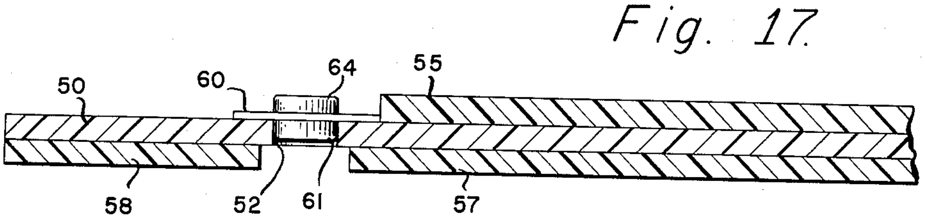
Fig. 17 is a fragmentary view of a section of the arrangement of Figs. 15 and 16.

Another form of registering device in accordance with the invention is shown in Figs. 15, 16 and 17. The device which is there illustrated is particularly suitable for use in step and repeat printing operations with a vacuum printing frame. As is well known, with vacuum printing frames, the plate and image are positioned between a bed and a lid which are brought together for application of pressure due to the vacuum. Thus there is only a selected spacing between lid and base within which a step and repeat mechanism can be positioned. Further, the base may be a ground glass structure lighted from below and suitable for use as a makeup table or for other layout work. It is highly desirable that the registering device be fully compatible with the vacuum printing frame. Further, it is desirable that the registering device also be capable of use by inexperienced personnel under darkroom conditions to provide reproducible and precise step and repeat results.

Referring now to Figs. 15–17, the form of registering device there shown satisfactorily fulfills all of these requirements. In this arrangement, the center board 50 of the registering device is a rectangular planar sheet of flexible but resilient material. The material may be partially opaque, but preferably has some degree of translucence, vinyl plastic being found to have the desired combination of properties. Along each margin of the rectangular center board 50 is provided a row of indexing holes 52 which are spaced at regular and like increments in the manner of the arrangement of Fig. 1. Each corner indexing hole 53 is common to two of the rows. The rows are disposed in rectangular coordinates so as to define precise reference lines on the center board 50.

The central portion of the top (as seen in Fig. 15) of the center board 50 is covered by an attached transparent plate 55 which forms a working surface on the center board 50. The working surface plate 55, as best seen in Fig. 17, has a selected uniform height above the center board 50. Positioned indicia, such as inch markings 56, may be marked along the different edges of the center board 50 in alignment with the indexing holes 52. A support surface may also be provided on the bottom of the center board 50 by an affixed support sheet 57, which is shown roughly coextensive with the working surface plate 55 but which may have other forms. The bottom support surface also includes marginal strips 58 extending along each of the edges of the center board 50 (best seen in Fig. 16). As seen most clearly in Fig. 17, the support sheet 57 and the marginal strips 58 have a selected uniform thickness or height relation with respect to the center board 50. The sheet 57 and the strips 58 do not extend into the region of the indexing holes 52, so that pins may be fully inserted into the holes 52 but do not project beyond the support surface. Preferably, the working surface plate 55, the support sheet 57 and the marginal strips 58 are all of a resilient and transparent plastic which can conform to the shape of a vacuum frame but which is not subject to distortions.

Figure 18:
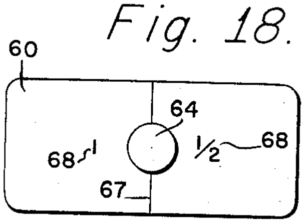
Fig. 18 is a plan view of one type of peg for use in the device of Fig. 15.
Figure 19:
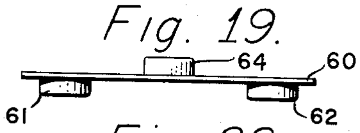
Fig. 19 is a side view of the peg of Fig. 18.
Figure 20:
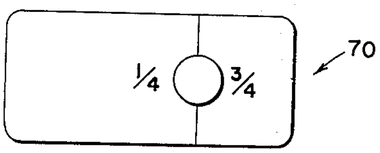
Fig. 20 is a plan view of a first compound offset peg for use in the device of Fig. 15.
Figure 21:
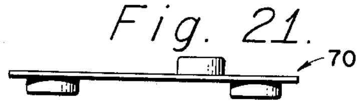
Fig. 21 is a side view of the peg of Fig. 20.
Figure 22:
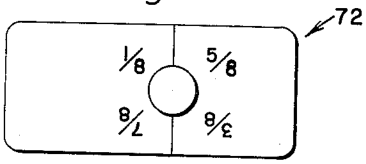
Fig. 22 is a plan view of a second compound offset peg for use in the device of Fig. 15.
Figure 23:
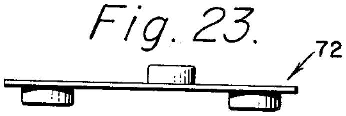
Fig. 23 is a side view of the peg of Fig. 22.
Figure 24:
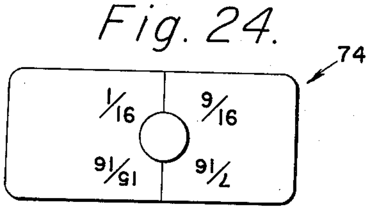
Fig. 24 is a plan view of a third compound offset peg for use in the device of Fig. 15.
Figure 25:
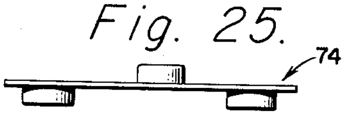
Fig. 25 is a side view of the peg of Fig. 24.
Figure 26:
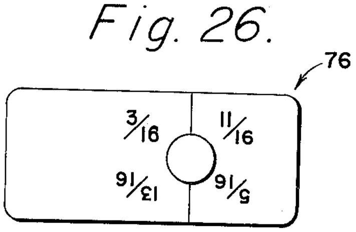
Fig. 26 is a plan view of a fourth compound offset peg for use in the device of Fig. 15.
Figure 27:
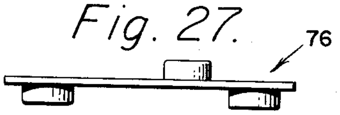
Fig. 27 is a side view of the peg of Fig. 26.

In Fig. 15, a number of pegs are shown inserted at selected points along the rows of indexing holes 52 to provide step and repeat registration of an image carrier in the manner previously described. The pegs which are utilized may have the form shown in Figs. 18 and 19, including the variations shown by the first through fourth compound offset pegs of Figs. 20, 22, 24 and 26 respectively. With reference to Figs. 18 and 19, the pegs each consist of a central plate 60 of rectangular form and comparatively small thickness. The central plate 60 is elongated along one dimension, this dimension corresponding to the line or axis of a row of indexing holes. A pair of pins 61, 62 shaped and spaced to register with adjacent ones of the indexing holes 52 are coupled to the bottom of the plate 60. The double pins 61, 62 lie along the axis of elongation of the plate 60. A positioning pin 64 for the image carrier extends from the opposite side of the plate 60 at a selected axial position with respect to the double pins 61, 62. Because this axial position varies with the different types of pegs, the positioning pin may also be referred to as the offset pin 64. For ease in identifying and using each of the different types of pegs, each is provided with alignment marks 67 which lie along a line extending transverse to the axis of the plate 60 and through the center of the offset pin 64. Each is also provided with inch markings 68 which indicate the fractional amount of offset of the offset pin 64 for that peg.

Each of the first through fourth compound offset pegs 70, 72, 74, 76 which provide selected variations in offset distance from the peg of Figs. 18 and 19 is shown in plan view in Figs. 20, 22, 24 and 26 respectively, and in side view in Figs. 21, 23, 25 and 27 respectively. Each of the second through fourth pegs 72, 74, 76 is capable of providing more than one offset distance, as denoted by the inverted fractional inch markings thereon.

The relationship of a peg to the center board 50 and the associated surfaces 55, 57 and 58 may be most clearly seen in Fig. 17. It is important to note that the double pins 61, 62, which register with the indexing holes 52, do not extend beyond the bottom support surfaces 57, 58, and that the offset pin 64 does not protrude above the working surface plate 55 to any appreciable extent. Thus the entire structure may be positioned within a vacuum printing frame and placed under vacuum without damaging the frame.

The double pins 61, 62 which are utilized for each peg are arranged to mate with a press fit in the associated indexing holes 52. This press fit, together with the use of double pins 61, 62 and the rows of indexing holes 52, insures accurate alignment in both coordinate directions of movement on the center board 50. Positions along the rows are established by the selection of the regularly spaced holes 52 together with the fractional displacement afforded by the selected offset pin 64. Precise lateral positioning with respect to the rows is assured by both the press fit and the double pins 61, 62 which prevent twisting or shifting of the offset pin 64 relative to the center board 50.

In Fig. 15, alignment of an image carrier 80 with respect to the board 50 may be achieved by the use of pairs of pegs on opposite sides of the board 50. The image carrier 80 has a centrally disposed transparency 81 and includes a pair of tabs 83, 84 for engagement with oppositely disposed pegs. Each of the tabs 83, 84 may be affixed to the image carrier 80 by a suitable adhesive holding member 86 or 87 respectively. With the carrier 80 in a selected position, and the tabs 83, 84 registering with a pair of pegs at like positions along opposite rows of the indexing holes 52, the holding members 86 and 87 may be applied to establish the desired permanent spatial relationship. The tabs 83, 84 may thereafter be retained on the image carrier 80 for future use.

Fig. 15 illustrates the use of the registering device in a setup in which three images are to be repeated at intervals along the center board 50. Thus a peg of the type shown in Figs. 18 and 19 is inserted at the zero indexing holes 52 in opposite rows. By way of example, the first two images are to be spaced at 5⅛" apart. To establish the 5⅛" spacing, the second compound offset pegs 72 are utilized. Thus the positioning is approximately determined by the indexing holes 52 but precisely determined by the chosen offset. In normal step and repeat the third image would be at 10¼" and the first compound offset pegs 70 would be used. By way of illustrating the versatility of the arrangement, however, the first compound offset pegs 70 are used to establish a 4⅝" differential spacing between the second and third steps, in the manner described with respect to the previously discussed devices. As mentioned above, the desired fractional displacement is precisely provided by selection of the proper peg type, even though the indexing holes 52 are ½" apart.

In Fig. 15, the image carrier 80 is shown at the second position in the desired sequence, with one image 90 already having been exposed. The positive and negative images have not been illustrated in precise detail. It will be evident that the successive positioning steps entail only disengagement of the tabs 83 and 84 from one set of pegs and affixation to the next set of pegs.

In use, the arrangement of Figs. 15–17 permits fast and simple operation under a wide variety of conditions. No special skills are required to utilize the arrangement in a vacuum printing frame under darkroom conditions. The entire center board 50, complete with preset positioned pegs, may be placed in the vacuum frame. To accomplish step and repeat operations the operator need only move the image carrier successively along the pegs. Because the tabs on the image carrier are permanently located, exact results are reproducible whenever desired. The setup is, however, quickly and easily changed, to provide for an entirely different step and repeat operation merely by repositioning selected pegs.

The advantages of this arrangement are not derived solely from the provision of a pre-settable substantially unitary registering device. As thus constructed, the registering device may also be utilized for layout and alignment work, for which it is particularly useful, because it can be lighted from below. Further, no special alignment procedures or hole punching devices are needed. Because both position and alignment are controlled by precisely and firmly located mechanical elements, there is substantially no danger of inaccuracies due to distortion under pressure or with time.

What is claimed is:

1. Apparatus for positioning a transparency with respect to a surface including the combination of a bed, a registering device arranged along at least one side of the bed, the registering device having indexing holes of like configuration spaced at regular intervals along its length, a plurality of indexing pegs removably inserted in the indexing holes of the registering device, said indexing pegs having pins on one side for engaging in said indexing holes and variably located pins on the other side intermediate said first mentioned pins at predetermined incremental distances therefrom, a carrier having engaging tabs at selected points thereon in engagement with certain of the pegs on the registering device, and a transparency mounted on the carrier so that the carrier may be stepped along at least one side of the registering device from peg to peg whereby the transparency is brought into engagement with the bed in a series of accurately located positions.

2. Apparatus for registering a carrier in position including the combination of a planar member having at least one row of equally spaced and like shaped indexing holes disposed in at least one line thereon, a plurality of pegs inserted in particular holes in the planar member, said pegs having pins on one side for engaging in said indexing holes and variably located pins on the other side intermediate said first mentioned pins at predetermined incremental distances therefrom, a carrier, and a plurality of tabs attached to the carrier in positions corresponding to the distance between adjacent variably positioned pins in the planar member whereby the carrier may be registered in position accurately with respect to the pegs.

3. A positioning device for an image carrier including a planar member having at least one row of regularly shaped and spaced positioning holes, alignment elements for registering with the positioning holes at selected points, each of the alignment elements being adapted to register with a press fit into two adjacent holes and having an offset pin oppositely extending from the portion to be pressfit into said holes for defining a spacing along the row which is an incremental fraction of the regular spacing between holes, and an image carrier having at least two tabs for registering with different ones of the alignment elements registered in the holes.

4. Apparatus for registering the location of the carrier in a step and repeat type printing process, including the combination of an L-shaped registering device having a first arm and a second arm transverse of the first arm, said registering device having indexing holes at regularly spaced intervals along the length of both said first and second arms, a plurality of pegs, each having a pin supporting member, at least one pin attached to the pin supporting member of each peg for engaging the registering device at certain of the indexing holes, at least one pin attached to the pin supporting member for engaging the carrier, said plurality of pegs including pegs of a first variety in which a carrier engaging pin is axially aligned with a registering device engaging pin, said plurality of pegs also including pegs of a second variety in which the carrier engaging pins are laterally offset from the registering device engaging pins, a plurality of tabs attached to a carrier in registry with the location of the carrier engaging pins on the registering device, and an image producing transparency supported by the carrier, whereby said carrier and said tabs are adapted to operate to allow the image producing transparency to be stepped from position to position in accurate registry with an image receiving plate.

5. Apparatus for use in a step and repeat type printing process including the combination of an L-shaped registering device having regularly spaced indexing holes arranged throughout its length, a carrier, and a plurality of pegs for insertion in the holes of the registering device, the plurality of pegs including pegs of a first variety having a pin engaging the registering device and another pin for engaging a carrier and axially aligned with the first mentioned pin, the plurality of pegs also including a second variety having a pair of pins for engaging the registering device at adjacent one of the indexing holes and a carrier engaging pin located at a predetermined distance between the pair of registering device engaging pins, the carrier including also a plurality of tabs fastened thereto, each of the tabs including a hole which is accurately formed to match the configuration of the carrier engaging pin so that the carrier may be accurately positioned with respect to the pins, whereby the carrier may further be positioned with respect to the registering device in increments of distance less than the distance between the regularly spaced indexing holes.

6. Apparatus for accurately positioning a transparency for a step and repeat type printing process including the combination of a bed, an indexing device comprising an arm extending along a length of the bed, the arm including regularly spaced indexing holes, a plurality of pegs engaged with predetermined ones of the holes in the indexing device, said pegs having pins on one side for engaging in said indexing holes and variably located pins on the other side intermediate said first mentioned pins at predetermined incremental distances therefrom, a transparency carrier, and a plurality of tabs attached to the carrier in positions engaging more than one of the pegs which are in the predetermined positions in the indexing device, whereby the carrier may be stepped along the pegs in the indexing device to print successively a plurality of like images from the transparency which are accuratelp positioned and aligned.

7. A positioning and alignment structure for step and repeat type printing including a rectangular planar member having regularly spaced and shaped apertures disposed in rows defining a rectangle about the margin of the member, the planar member also including a raised working surface plate in a central region thereof and raised bottom support surfaces, positioning pegs removably registering with selected apertures along the rows, the pegs each including pins shaped to correspond to the apertures and also including offset pins extending oppositely from the first mentioned pins to define selected offset distances along the rows, and an image carrier in operative engagement with the working support plate on the rectangular planar member and including positioning tabs in engagement with the offset pins of at least two selected ones of the positioning pegs.

8. A system for use with a vacuum printing frame, for reproducibly aligning a part of an image carrier at precisely displaced positions with respect to a plate, and including in combination a rectangular, resilient, at least partially translucent planar central board member having a number of rows of positioning holes, each row being disposed along a different margin of the board, each hole along a row being spaced a selected like distance from the adjacent holes, spacing indicia on a periphery of the central board member along each of the rows of apertures, a rectangular, resilient, translucent planar working surface plate affixed to one side of the central board between and symmetrical with the rows of holes, and having a selected height above the surface of the central board, resilient, translucent planar members affixed to the other side of the central board in regions other than those coextensive with the rows of holes to provide a level base surface for the structure, alignment pegs having a pair of pins on one side thereof, each of the pins of a pair registering with corresponding adjacent holes in a row of holes with a press fit, each peg also including an offset pin which is displaced along the row with a selected incremental spacing with relation to the regular spacing between holes, and an image carrier for supporting a transparency in a fixed relation thereon, the image carrier including tabs, each registering with a selected one of the offset pins for aligning the image carrier with respect to the central board.

9. A portable, pre-settable board for step and repeat printing comprising a rectangular, resilient planar central board member having a number of rows of positioning holes, each row being disposed along a different margin of the board, each hole along a row being spaced a selected like distance from the adjacent holes, a rectangular, resilient, translucent planar working surface plate affixed to one side of the central board member between and symmetrical with the rows of holes, and resilient, translucent planar members affixed to the other side of the central board member in regions other than those coextensive with the rows of holes.

10. An alignment device for use with regularly spaced and shaped apertures extending in a row, said device including a central plate body, a pair of positioning pins coupled to the plate on one side thereof and shaped to register with the apertures, the pair of pins extending normal to the plate body and spaced apart along the aperture row to conform to the spacing of the apertures, and an offset pin coupled to the other side of the plate body and extending therefrom at a position intermediate the pair of pins which is selected to correspond to a fractional part of the regular spacing between the apertures.

11. A method of preparing an image carrier for use in a step and repeat type printing process including in combination the steps of inserting pegs in a registering device in accordance with the distance between like images to be reproduced in the step and repeat printing process, placing a carrier over the registering device, and attaching to the carrier a perforated tab which is positioned in accordance with a position of a selected peg in the registering device, so that the carrier may be stepped along a registering strip in which pegs have been placed during a step and repeat printing process.

12. A method of preparing image carriers for step and repeat type printing in which at least two parallel rows of images are to be reproduced, including in combination the steps of inserting a corner peg in a registering device, inserting a peg along one arm of the registering device at a distance from the corner peg corresponding to the distance between adjacent images to be reproduced in a row, inserting a peg in an arm of the registering device transverse of the aforementioned arm of the device at a distance from the corner peg corresponding to the distance between adjacent rows of images to be reproduced, placing an image carrier over each of the pegs, attaching peg receiving tabs to the carrier in the location of each peg, turning the image carrier over and mating the corner peg receiving tab with one of the arm pegs, cutting a hole in the image carrier roughly oriented in accordance with the position of the other peg, and attaching a perforated tab at the last named hole whereby an image carrier is provided with parallel rows of holes which are spaced in one direction in accordance with the distance between images in a row and in a transverse direction in accordance with the distance between rows of images to be reproduced.

References Cited in the file of this patent

UNITED STATES PATENTS

| | | |
|---|---|---|
| 2,711,031 | Kessler | June 21, 1955 |
| 2,760,273 | Bregman | Aug. 28, 1956 |
| 2,825,976 | Radencic | Mar. 11, 1958 |